United States Patent
Hensinger et al.

(10) Patent No.: US 11,938,427 B2
(45) Date of Patent: Mar. 26, 2024

(54) RING FILTER ELEMENT AND LIQUID FILTER DEVICE

(71) Applicant: Mahle International GmbH, Stuttgart (DE)

(72) Inventors: Heiko Hensinger, Stuttgart (DE); Markus Lang, Loechgau (DE)

(73) Assignee: Mahle International GmbH (DE)

( * ) Notice: Subject to any disclaimer, the term of this patent is extended or adjusted under 35 U.S.C. 154(b) by 118 days.

(21) Appl. No.: 17/583,142

(22) Filed: Jan. 24, 2022

(65) Prior Publication Data

US 2022/0233980 A1 Jul. 28, 2022

(30) Foreign Application Priority Data

Jan. 25, 2021 (DE) .................. 102021200612.4

(51) Int. Cl.
*B01D 35/16* (2006.01)
*B01D 29/21* (2006.01)
*B01D 35/30* (2006.01)

(52) U.S. Cl.
CPC .............. *B01D 35/16* (2013.01); *B01D 29/21* (2013.01); *B01D 35/30* (2013.01); *B01D 2201/0415* (2013.01); *B01D 2201/0453* (2013.01)

(58) Field of Classification Search
CPC ........ B01D 35/16; B01D 29/21; B01D 35/30; B01D 2201/0415; B01D 2201/0453; B01D 2201/291; B01D 2201/304; B01D 29/15
See application file for complete search history.

(56) References Cited

U.S. PATENT DOCUMENTS

| | | | |
|---|---|---|---|
| 4,619,764 A * | 10/1986 | Church ................ | B01D 17/045 210/248 |
| 6,706,181 B1 | 3/2004 | Baumann et al. | |
| 6,936,169 B2 | 8/2005 | Baumann et al. | |
| 8,168,066 B2 | 5/2012 | Wieczorek et al. | |
| 11,724,220 B2 | 8/2023 | Ouweleen et al. | |
| 2006/0006109 A1* | 1/2006 | Klein .................. | B01D 36/003 210/DIG. 5 |

(Continued)

FOREIGN PATENT DOCUMENTS

| | | |
|---|---|---|
| DE | 19951085 A1 | 4/2001 |
| DE | 112007001880 T5 | 9/2009 |

(Continued)

OTHER PUBLICATIONS

European Search Report dated Apr. 8, 2022 related to corresponding European Patent No. 21218168.9.

(Continued)

*Primary Examiner* — Waqaas Ali
(74) *Attorney, Agent, or Firm* — Fishman Stewart PLLC

(57) ABSTRACT

A ring filter element, e.g., for a liquid filter device, is disclosed. The ring filter element includes an upper end disc, a lower end disc, and a filter material arranged in between the upper end disc and the lower end disc. A pin eccentrically arranged on the lower end disc that projects in an axial direction is provided for closing off a drainage channel. At least one support contour is disposed on the lower end disc adjacently to the pin. The at least one support contour projects from the lower end disc in the axial direction for supporting on a filter housing.

20 Claims, 4 Drawing Sheets

(56) References Cited

U.S. PATENT DOCUMENTS

| | | | |
|---|---|---|---|
| 2006/0186031 A1* | 8/2006 | Fick | B01D 36/003 |
| | | | 210/235 |
| 2013/0062270 A1* | 3/2013 | Braunheim | B01D 36/001 |
| | | | 210/232 |
| 2018/0257011 A1 | 9/2018 | Boden et al. | |
| 2019/0262751 A1 | 8/2019 | Jainek | |

FOREIGN PATENT DOCUMENTS

| | | |
|---|---|---|
| DE | 112018000382 T5 | 9/2019 |
| EP | 1 229 985 B1 | 8/2003 |
| WO | 2018/087294 A1 | 5/2018 |

OTHER PUBLICATIONS

German Search Report for DE-102021200612.4, dated Sep. 7, 2021.

European Search Report dated Jul. 28, 2023 for European Patent Application No. 23186127.9.

\* cited by examiner

RING FILTER ELEMENT AND LIQUID FILTER DEVICE

CROSS-REFERENCE TO RELATED APPLICATION

This application claims priority to German Application No. 10 2021 200 612.4 filed on Jan. 25, 2021, the contents of which are hereby incorporated by reference in its entirety.

TECHNICAL FIELD

The present invention relates to a ring filter element having an upper end disc, a lower end disc and a filter material arranged in between. In addition, the invention relates to a liquid filter device having a filter housing with a drainage channel and such a ring filter element arranged in the filter housing.

BACKGROUND

From EP 1 229 985 B1 a generic ring filter element having an upper end disc, a lower end disc and a pleat star arranged in between and having a pin arranged eccentrically on the lower end disc and projecting in the axial direction.

From DE 11 2018 000 382 T5 a filter system having an undulating intermeshing housing-end plate interface geometry is known, in which a filter element end plate and a filter housing component meet at an interface. The filter housing component includes an undulating or repetitive pattern which meshes with a fitting undulating or repetitive pattern on the end plate of the filter element. The undulating or repetitive pattern is to prevent that the filter element rotates freely with respect to the filter housing component of the filter system.

In generic ring filter elements a breaking-off or tearing-off of a pin closing off a drainage channel can occur during a constant load resulting from a pressure loading of an end disc due to pulsations occurring during the operation. The tearing-off of the pin results in problems at least when replacing the ring filter element since the pin can be no longer pulled out together with the ring filter element. In addition, there is the risk that a torn-off pin no longer reliably closes off the drainage channel during the operation, as a result of which a proper functioning of a liquid filter device equipped with such a ring filter element can no longer be ensured.

The present invention therefore deals with the problem of stating for a ring filter element of the generic type an improved or at least an alternative embodiment which overcomes the disadvantages known in particular from the prior art.

According to the invention, this problem is solved through the subject of the independent claim(s). Advantageous embodiments are subject of the dependent claims.

SUMMARY

The present invention is based on the general idea of providing a ring filter element, via its lower end disc, with a direct or indirect support capability relative to a filter housing of a filter device and thereby significantly reduce loads acting on the pin during the operation of the liquid filter device caused in particular by pulsations. Here, the ring filter element according to the invention has an upper end disc, a lower end disc and a filter material arranged in between, which can be formed for example as a pleat star pleated zigzag-like. On the lower end disc an eccentrically arranged pin projecting from the lower end disc in the axial direction for closing off a drainage channel in a filter housing of a liquid filter device is arranged. According to the invention, at least one support contour projecting from the lower end disc is now provided on the lower end disc adjacently to the pin for the direct or indirect support on a filter housing. By way of this at least one support contour it is possible to support the lower end disc and thereby the ring filter element directly or indirectly relative to the filter housing, which, in particular with pulsations occurring during the operation, offers the major advantage that the load no longer acts on the interface between pin and lower end disc, at which a comparatively large notch effect can occur, but can be discharged via the support contour from the end disc or the pin directly into the filter housing. The pressure pulsations cause a pressure onto the lower end disc and a pushing-in of the pin into the drainage channel which, during pressure pulsations, results in that the pin moves piston-like in the drainage channel and at its connecting point to the lower end disc is subjected to a severe notch load which in the long-term leads to a tearing-off of the pin. The supporting of the lower end disc on the filter housing also includes the indirect supporting of the lower end disc via the pin and the support contours on the filter housing, as a result of which in particular the pin, when pressure pulsations occur, can be directly supported via the support contours on the filter housing and because of this no longer pushed into the drainage channel. By way of this, a breaking-off of the pin from the lower end disc caused by pressure pulsations occurring during the operation of the liquid filter device as well as the concomitant disadvantages, such as for example difficulties during the replacement of the ring filter element and any leakages that may occur because of the broken-off pin can be avoided. With the solution according to the invention, i.e. with the at least one support contour according to the invention, a significantly increased functional safety can be created with almost marginal additional constructional effort. Here it is obviously conceivable that the at least one support contour is formed integrally with the lower end disc and can be produced for example together with the same in a common plastic injection moulding operation. Thus, merely a once-off conversion of a plastic injection mould is required for realising the invention, wherein it is purely theoretically obviously also conceivable that the at least one support contour is subsequently arranged, for example glued to a conventional lower end disc, which offers the major advantage that conventional ring filter element can also be retrofitted according to the invention.

Here, the at least one support contour can also be arranged in particular in a transition region of the pin into the lower end disc, as a result of which the pin, in its region at risk from notch loading in the past, can be significantly relieved and the risk of the tearing-off of the pin at least reduced. "Adjacently to the pin", need/should not in this context mean separate from the same, but can also mean on a shank of the pin. The support contours are arranged merely radially offset (adjacently) to the axis of the pin.

In an advantageous further development of the solution according to the invention, two support contours are provided which each extend tangentially or in the circumferential direction from a shank of the pin and are integrally joined both with the shank of the pin and also with the lower end disc. Such an embodiment offers the major advantage that the support contours can both be formed integrally with the lower end disc and thus also produced together with the same, as well as also with the shank of the pin, so that in this embodiment the lower end disc can be produced together with the pin and the at least one support contour preferentially as an integral plastic injection moulded part and thus as a simple construction and cost-effectively. Through the integral connection of the at least one support contour to the shank of the pin, a stiffening of the pin can be additionally achieved, as a result of which the same is sturdier and thus less sensitive to damage during the handling. Because of the integral connection of the at least one support contour to the shank of the pin, in particular the notch loading present there up to now because of the angular transition from the shank of the pin into the lower end disc, which was contributory to the tearing-off of the pin because of the pressure pulsations, can be significantly reduced. In particular in a region near the end disc, the shank of the pin can still be considered as part of the lower end disc.

Practically, the shank of the pin has a cruciform cross-section with two crossing webs, wherein at least two support contours are connected at least to one of the webs. The preferentially two support contours thus lengthen the respective web in the radial direction of the shank of the pin, wherein for producing the two support contours in this case merely the injection mould has to be suitably adapted in the region of the said web.

In a further advantageous embodiment of the solution according to the invention, the at least one support contour comprises a support surface that is parallel to a surface of the lower end disc. When two support contours are provided, each of these comprises a support surface that is parallel to a surface of the lower end disc. With a counter-support surface formed complementarily thereto on the filter housing, a flat placement of the ring filter element via its lower end disc and the at least one support contour against the filter housing can be created by way of such a parallel support surface, as a result of which no highly stressed concentrated load transmission takes place but the load can be areally distributed.

In an alternative embodiment, the at least one support contour comprises a support surface inclined towards a surface of the lower end disc, wherein in the case that two support contours are provided, each of these comprise a support surface inclined towards a surface of the lower end disc and extending for example arrow-like. Such an inclined support surface can bring about for example an axial support of the lower end disc and thus of the ring filter element on a funnel-shaped inlet of the drainage channel. The inclined support surface in this case can either be formed in a flat or convex manner, as a result of which an areal or linear placement against a conical internal lateral surface of a funnel-shaped inlet of the drainage channel can be brought about. A convexly formed support surface offers the great advantage that the same can compensate for any dimensional inaccuracies and installation tolerances. Here, the end disc also supports itself on the filter housing via the pin and the support contours.

In a further alternative embodiment of the ring filter element according to the invention, two support contours are arranged on the lower end disc separately and directly adjacently to the pin or its shank and formed in the manner of knobs or elevations. Such knobs can be formed integrally with the lower end disc and because of this be also produced in a technical simple and also cost-effective manner. Purely theoretically however it is also conceivable to produce such support contours separately and retrofit conventional ring filter elements with these in that the support contours are welded or glued for example to the lower end disc. In this case it is merely necessary to check whether corresponding counter-support surfaces, on which the support contours of the ring filter element can support themselves, are present in a filter housing in which the ring filter element is being installed.

In a further alternative embodiment, the support contour comprises ring segment-like support elements which are at least partly arranged round about the pin or its shank. Because of the support contour formed ring segment-like with interruptions arranged in the circumferential direction in between, a reliable draining of liquid present in the filter housing can be ensured when replacing the ring filter element. Because of the ring segment-like support elements, an even support of the lower end disc relative to the filter housing round about the pin or its shank can be additionally effected, as a result of which the risk of damage to the pin can be reduced. Alternatively to this it is also conceivable that the support contour is arranged annularly closed round about the pin. In this case, the support contour could be utilised as additional sealing contour which, with a ring filter element installed in a filter housing and a pin dipping into a drainage channel of the filter housing, makes possible an additional sealing provided the support contour lies tightly against an inlet of the drainage channel.

Again alternatively, the pin could also be supported at its tip when in the drainage channel for example a transverse pin is introduced.

Further, the present invention is based on the general idea of forming a liquid filter device, for example a fuel filter or an oil filter, with a filter housing having a drainage channel and a ring filter element arranged in the filter housing according to the preceding paragraphs, wherein the ring filter element in the installed state supports itself directly on the filter housing via the at least one support contour projecting from the lower end disc in the axial direction. By way of this, a loading of the pin or a shank of the pin, caused for example by pressure pulsations during the operation of the liquid filter device, can be in particular reduced and by way of this the life expectation of the liquid filter device significantly increased.

Practically, an at least partial surrounding edge is arranged on the drainage channel on which the ring filter element with its lower end disc and its two support contours with their support surfaces that are each parallel to a surface of the lower end disc supports itself. By way of this it is possible to support the lower end disc in the vicinity of the drainage channel relative to the filter housing, making possible a relieving of the pin.

Alternatively to this it is also conceivable that the drainage channel comprises a funnel-shaped inlet with a conical inner surface on which the ring filter element supports itself with its lower end disc and its support contours with their support surfaces each inclined towards a surface of the lower end disc. When, here, the support surfaces are formed flat, an areal contact and thus an areal support can thus be achieved by a likewise flat counter-support surface on the inner surface of the funnel-shaped inlet. However, a convex design of the support surfaces of the support contours is also conceivable, by way of which these merely lie punctiformly or linearly against the counter-support surfaces on the filter housing side and because of this make possible compensating for example for dimensional or production tolerances. Here, the support contours can be arranged on the shank of the pin, wherein the region of the shank near the end disc with the support contours can also be seen as part of the lower end disc.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

There it shows, in each case schematically.

DETAILED DESCRIPTION

Figure 1:
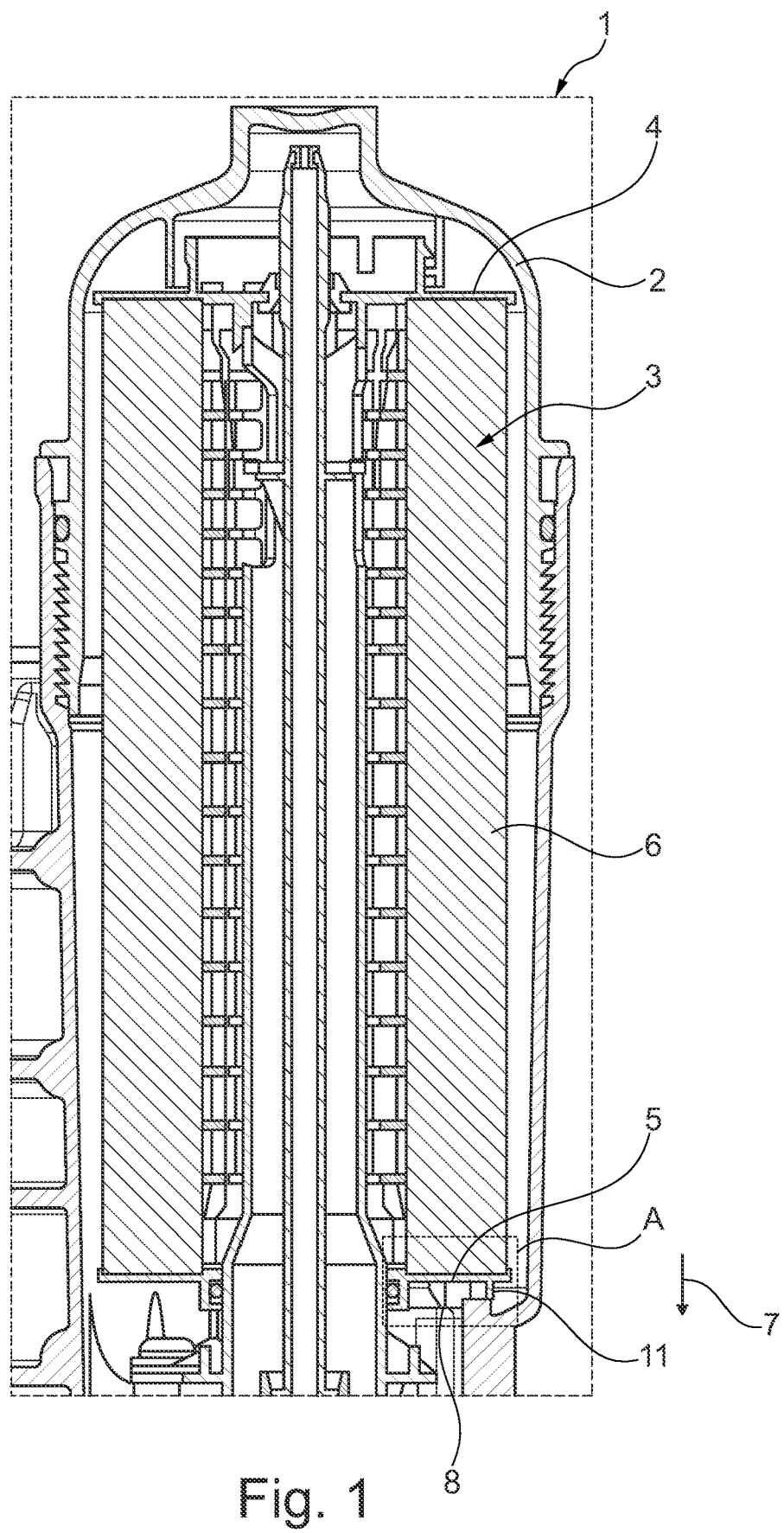
FIG. 1 illustrates a sectional representation through a liquid filter device according to the invention.
Figure 2:
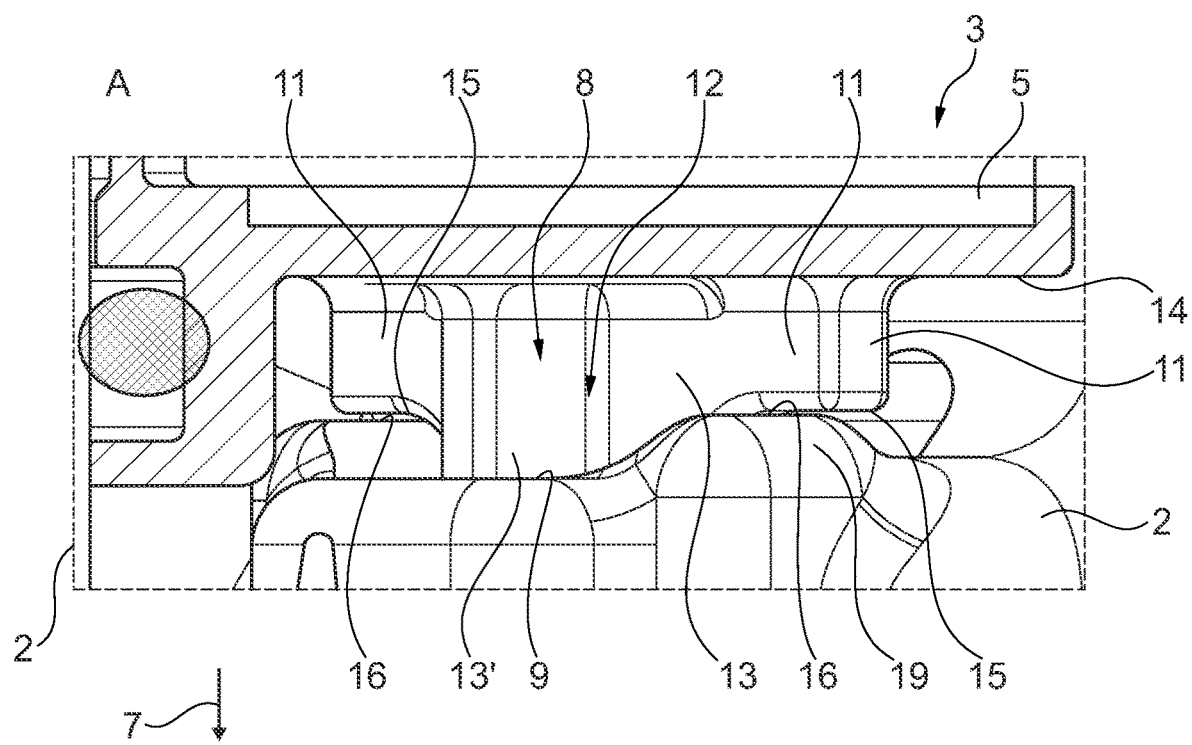
FIG. 2 illustrates a detail representation A from FIG. 1 in the region of an inlet of a drainage channel and a lower end disc supporting itself relative to a filter housing via support contours.
Figure 3:
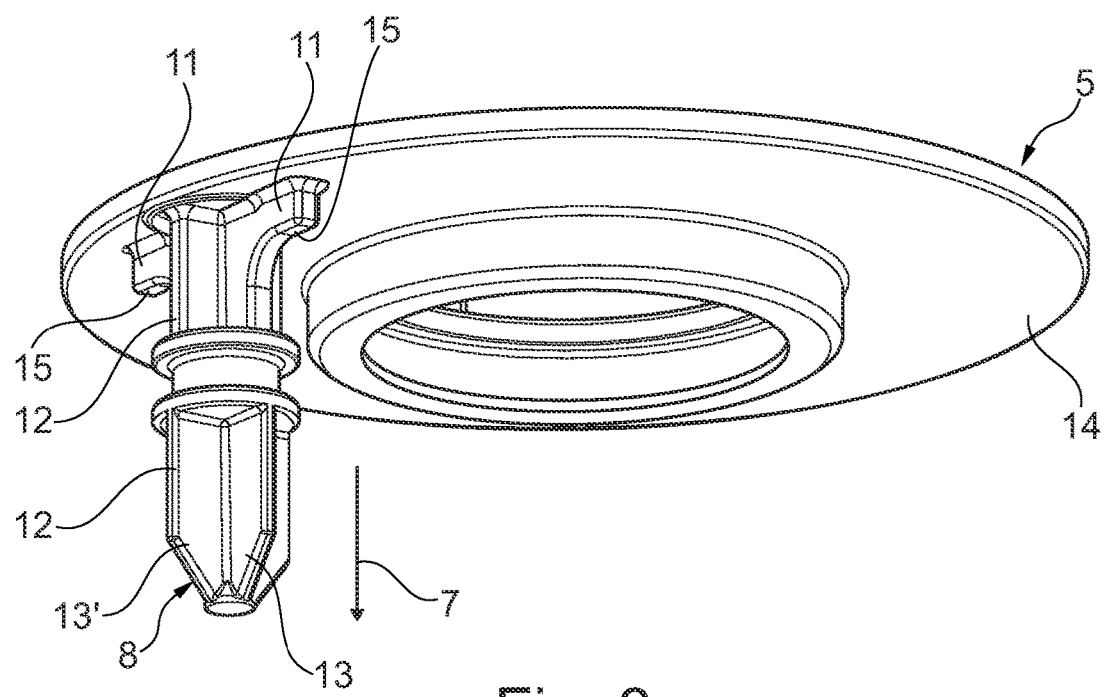
FIG. 3 illustrates another view of a lower end disc according to the invention of a ring filter element according to the invention.
Figure 4:
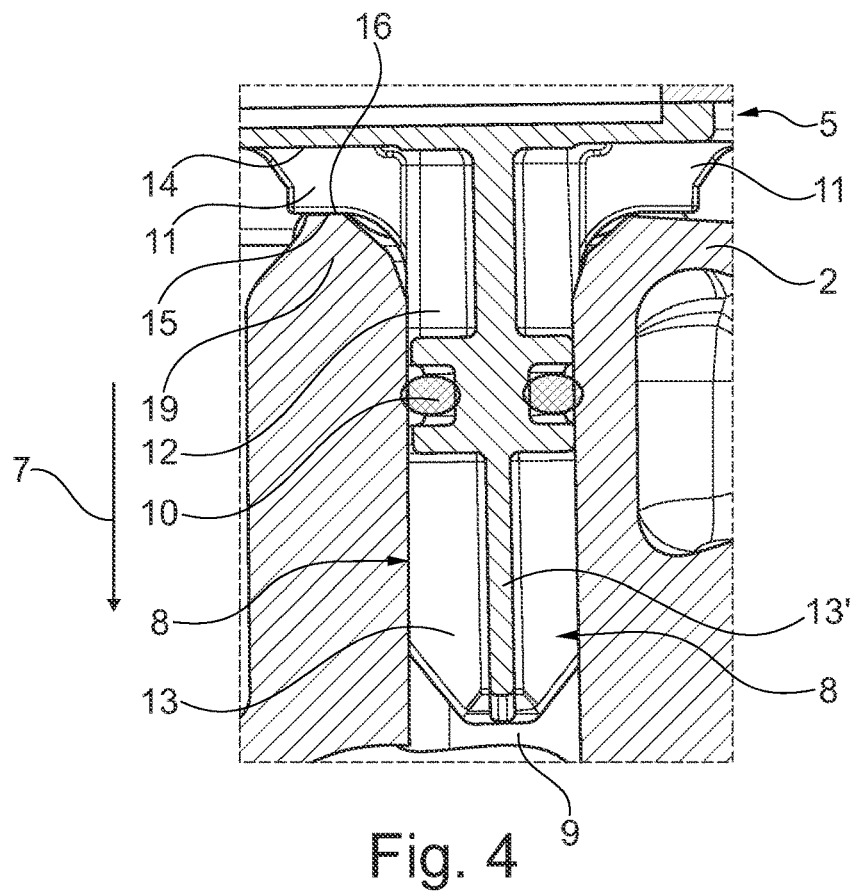
FIG. 4 illustrates a sectional representation through a filter housing in the region of a drainage channel having a lower end disc supporting itself on the filter housing via support contours.
Figure 5:
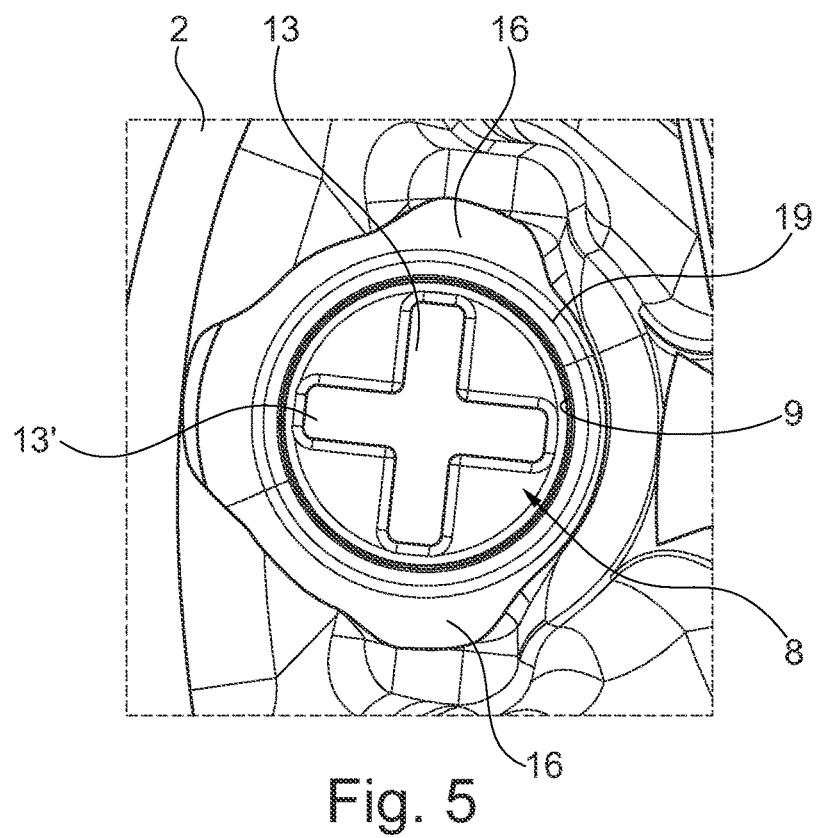
FIG. 5 illustrates a view from the top of counter-support contours on the filter housing in the region of a drainage channel with sectioned pin.

According to FIG. 1, a liquid filter device 1 according to the invention, for example an oil filter, a hydraulic filter or a fuel filter, comprises a filter housing 2 and a ring filter element 3 according to the invention arranged therein. In the known manner, the ring filter element 3 has an upper end disc 4, a lower end disc 5 as well as a filter material arranged in between, which is designed for example in the form of a pleat star pleated in a zigzag manner. On the lower end disc 5 a pin 8 is eccentrically arranged and projects from the lower end disc 5 in the axial direction 7 (see also FIGS. 2 to 7) for closing off a drainage channel 9. Thus, with the ring filter element 3 installed in the filter housing, the pin 8 thus dips into the drainage channel 9 closing off the same, for example by means of an O-ring seal 10 (see FIGS. 4, 6 and 7). According to the invention, at least one support contour 11 projecting from the lower end disc 5 is now provided on the lower end disc 5 adjacently to the pin 8, via which the lower end disc 5 and thus the ring filter element 3 can support itself directly on the filter housing 2. This offers the major advantage that pressure pulsations caused for example by a pump during the operation of the liquid filter device 1 can be transmitted from the ring filter element 3 via the support contours 11 directly to the filter housing 2 and because of this a load for the pin 8 can be significantly reduced. By way of this, in particular the risk of the pin 8 breaking off near the lower end disc 5 under continuous subjection to pressure pulsations can be reduced.

In the following, different embodiments of the support contours 11 according to the invention are now discussed:

According to FIGS. 1 to 4, two support contours 11 are provided which each extend tangentially from a shank 12 of the pin 8 and are integrally formed both with the shank 12 of the pin 8 and also with the lower end disc 5. Here, the shank 12 of the pin 8 has a cruciform cross-section with two crossing webs 13, 13', wherein the two support contours 11 are connected to one of the webs 13, 13', here to the web 13, or are formed integrally with the same. By way of this, a particularly simple and cost-effective production of the support contours 11 according to the invention can be created, since these, through a simple change of a plastic injection mould, can be produced together with the pin 8 or the shank 12 of the same and the entire lower end disc 5.

Looking at the support contours 11 according to FIGS. 1 to 4, it is noticeable that the support contours 11 shown there each comprise a support surface 15 that is parallel to a surface 14 of the lower end disc 5. Alternatively to this, the two support contours 11 according to FIG. 6 each comprise a support surface 15' inclined towards the surface 14 of the lower end disc 5.

Because of the integral connection of the at least one support contour 11 to the shank 12 of the pin 8, the notch loading present there to date because of the angular transition from the shank 12 of the pin 8 into the lower end disc 5, which was contributory to the tearing-off of the pin 5 because of the pressure pulsations, can be significantly reduced or even avoided. Here, the shank 12 of the pin 5 can, in particular in a region near the end disc, be still considered as part of the lower end disc 5. The at least one support contour 11 can also be arranged in a transition region of the pin 8 or its shank 12 into the lower end disc 5. "Adjacently to the pin 8" need/should not mean in this context separately to the same but can also mean on the shank 12 of the pin 8.

The support of the lower end disc 5 on the filter housing 2 also includes the indirect support of the lower end disc 5 via the pin 8 and the support contours 11 on the filter housing 2, as a result of which in particular the pin 8, in the case of pressure pulsations occurring, can be directly supported on the filter housing 2 via the support contours 11 and because of this no longer pushed into the drainage channel 9.

Figure 6:
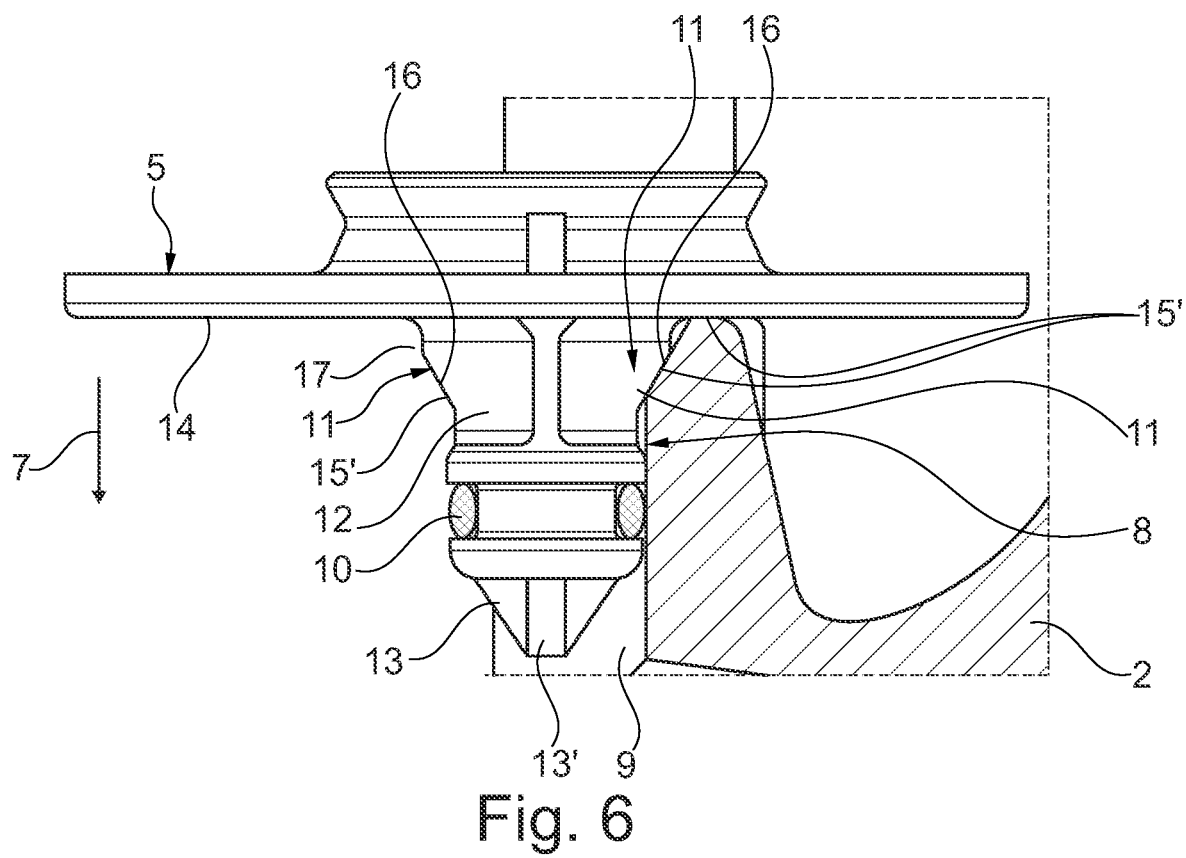
FIG. 6 illustrates a partially sectioned view of a drainage channel for illustrating inclined support surfaces.
Figure 7:
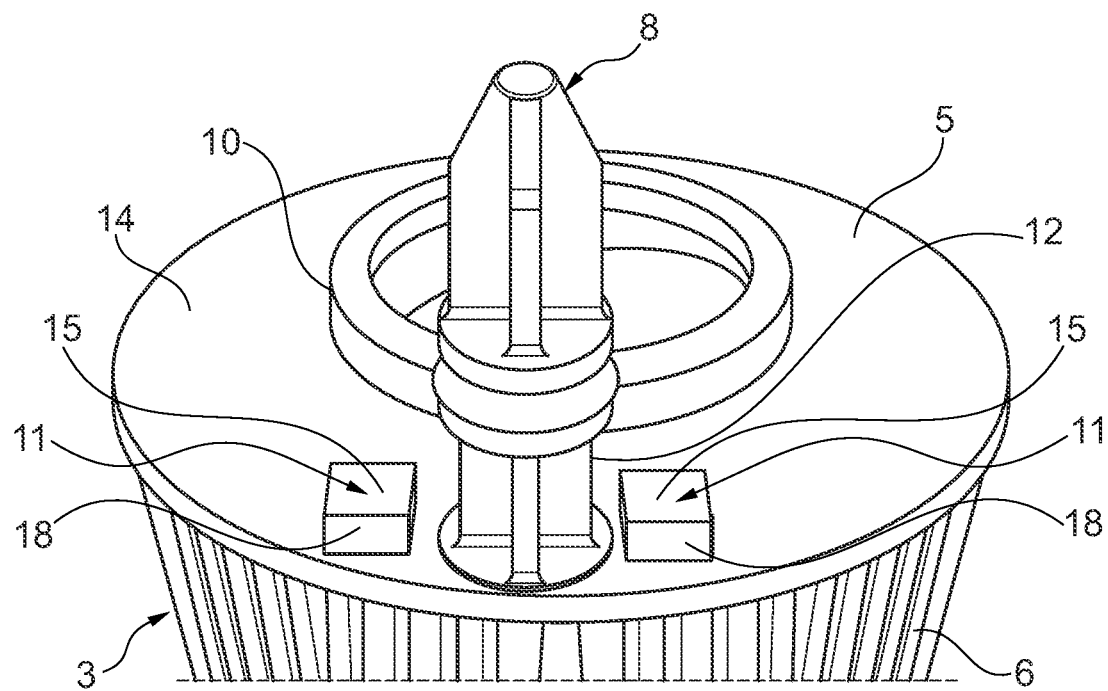
FIG. 7 illustrates a view from below of a lower end disc of a ring filter element according to the invention with support contours arranged separately from the pin.

The support surface 15' shown according to FIG. 6 can be formed flat and inclined towards the surface 14 of the lower end disc 15 or convexly, as a result of which no areal contact with a counter-support surface 16 at an inlet 17 of the drainage channel 9 is created, but merely a linear contact. In this case, the inlet 11 is formed funnel-like with a conical inner surface, on which the ring filter element 3 supports itself with its lower end disc 5 and its two support contours 11 each with their support surfaces 15' inclined towards the surface 14 of the lower end disc 5. In this case, the support contours can additionally serve for aligning the pin 8 relative to the drainage channel 9 and because of this at least promote an easy introduction of the pin 8 into the drainage channel 9.

In the embodiment according to FIGS. 1 to 5, the support surfaces 15 are formed parallel to the surface 14 of the lower end disc 5, wherein at least one counter-support surface 16 (see FIG. 5) likewise runs parallel to the surface 14 of the lower end disc 5, so that an areal support of the support contours 11, via their support surfaces 15, on the counter-support surfaces 16 located opposite takes place.

Purely theoretically it is obviously also conceivable that the support contour 11 (not shown) comprises ring segment-like support elements, which are arranged at least partly round about the pin 8. By way of this, a particularly even support of the lower end disc 5 and thus of the ring filter element 3 in the axial direction 7 relative to the filter housing 2 is possible. Alternatively to this it is obviously also conceivable that the support contour 11 is formed as a closed ring round about the shank 12 of the pin 8 so that by a placement of the support contour 11 via its support surface 15 a tight placement against a counter-support surface 16 can be achieved, as a result of which the support contour 11 cannot only assume a support function but also a sealing function at the same time.

Alternatively to this it is also conceivable that the at least one support contour 11 is arranged separately and directly adjacently to the pin 8 on the lower end disc 5 and formed in the manner of knobs 18. Such an embodiment having two support contours 11 arranged separately and directly adjacently to the pin 8 on the lower end disc 5 is shown for example according to FIG. 7. With a support contour 11 formed in such a manner it is possible to also retrofit conventional ring filter elements rendering them less sensitive to pressure pulsations. Here it is desirable to arrange the support contours 11 as closely as possible on the shank 12 of the pin 8 in order to be able to support the same directly on the filter housing 2.

With the ring filter element 3 according to the invention and the liquid filter device 1 according to the invention it is possible to significantly reduce the load for a pin 8 during the operation of the liquid filter device 1, for example caused by pressure pulsations triggered by a pump and because of this also significantly lower the risk of the pin 8 breaking off. According to the invention, this is brought about by a direct support of the ring filter element 3, via its lower end disc 5 and the support contours 11 arranged thereon, on the filter housing 2. For realising the support contours 11 according to the invention, merely a once-off change of a plastic injection mould used for producing the lower end disc 5 is required in the most favourable of cases. By way of separately formed support contours 11, which can be arranged for example glued or welded to the lower end disc 5 of conventional ring filter elements, a retrofitting is also possible comparatively easily.

The invention claimed is:

1. A ring filter element, comprising:
   an upper end disc, a lower end disc and a filter material arranged in between the upper end disc and the lower end disc,
   a pin eccentrically arranged on the lower end disc and projecting in an axial direction for closing off a drainage channel,
   at least one support contour disposed on the lower end disc adjacently to the pin, the at least one support contour projecting from the lower end disc in the axial direction for supporting on a filter housing,
   wherein the at least one support contour includes at least two support contours that each extend tangentially or in a circumferential direction from a shank of the pin, and
   wherein the shank of the pin has a cruciform cross-section and two crossing webs, wherein the at least two support contours are connected to at least one of the two webs.

2. The ring filter element according to claim 1, wherein the at least two support contours are integrally joined with the shank of the pin and with the lower end disc.

3. The ring filter element according to claim 1, wherein the lower end disc is formed together with the pin and the at least two support contours as an integral plastic injection moulded part.

4. The ring filter element according to claim 1, wherein at least one of the at least two support contours comprises a support surface that is parallel to a surface of the lower end disc.

5. The ring filter element according to claim 1, wherein at least one of the at least two support contours has a support surface inclined towards a surface of the lower end disc.

6. The ring filter element according to claim 1, wherein the pin includes an O-ring seal.

7. The ring filter element according to claim 1, wherein one of:
   the at least one support contour includes a plurality of ring segment support elements that are at least partly arranged around the pin, and
   the at least one support contour is arranged closed annularly around the pin.

8. A liquid filter device, comprising:
   a filter housing including a drainage channel;
   a ring filter element arranged in the filter housing, the ring filter element including:
      an upper end disc, a lower end disc and a filter material arranged in between the upper end disc and the lower end disc,
      a pin eccentrically arranged on the lower end disc and projecting in an axial direction for closing off the drainage channel,
      at least one support contour disposed on the lower end disc adjacently to the pin, the at least one support contour projecting from the lower end disc in the axial direction,
      wherein the at least one support contour includes two support contours that each extend tangentially or in a circumferential direction from a shank of the pin,
      wherein the shank of the pin has a cruciform cross-section and two crossing webs, and wherein the at least two support contours are connected to at least one of the two webs, and
   wherein the ring filter element in an installed state supports itself on the filter housing via the at least one support contour that projects from the lower end disc in the axial direction.

9. The liquid filter device according to claim 8, wherein on the drainage channel an at least partly surrounding edge with a counter-support surface is arranged, on which the ring filter element supports itself via the lower end disc and the at least one support contour, the at least one support contour having a support surface that is parallel to a surface of the lower end disc and engages with the counter-support surface.

10. The liquid filter device according to claim 8, wherein the drainage channel comprises a funnel-like inlet with a conical inner surface that provides a counter-support surface on which the ring filter element supports itself via the lower end disc and the at least one support contour, wherein the at least one support contour includes at least two support contours having respective support surfaces each inclined towards a surface of the lower end disc.

11. The liquid filter device according to claim 8, wherein the pin includes an O-ring seal.

12. The liquid filter device according to claim 8, wherein the two support contours are integrally joined with the shank of the pin and with the lower end disc.

13. The liquid filter device according to claim 8, wherein the lower end disc is formed together with the pin and the at least two support contours as an integral plastic injection moulded part.

14. The liquid filter device according to claim 8, wherein at least one of the at least two support contours has a support surface that is parallel to a surface of the lower end disc.

15. The liquid filter device according to claim 8, wherein the at least one of the at least two support contours has a support surface that is inclined towards a surface of the lower end disc.

16. The liquid filter device according to claim 8, wherein the at least one support contour includes a plurality of ring segment support elements that are at least partly arranged around the pin.

17. The liquid filter device according to claim 8, wherein the at least one support contour is arranged closed annularly around the pin.

18. The liquid filter device according to claim 8, wherein the filter material is a pleated star.

19. The ring filter element according to claim 1, wherein the filter material is a pleated star.

20. A liquid filter device, comprising:
   a filter housing including a drainage channel;
   a ring filter element arranged in the filter housing, the ring filter element including:
      an upper end disc, a lower end disc and a filter material arranged in between the upper end disc and the lower end disc,
      a pin eccentrically arranged on the lower end disc and projecting in an axial direction for closing off the drainage channel,
      at least one support contour disposed on the lower end disc adjacently to the pin, the at least one support contour projecting from the lower end disc in the axial direction,
   wherein the ring filter element in an installed state supports itself on the filter housing via the at least one support contour that projects from the lower end disc in the axial direction, and
   wherein the drainage channel comprises a funnel-like inlet with a conical inner surface that provides a counter-support surface on which the ring filter element supports itself via the lower end disc and the at least one support contour, wherein the at least one support contour includes at least two support contours having respective support surfaces each inclined towards a surface of the lower end disc.

* * * * *